United States Patent
Ku et al.

(10) Patent No.: US 9,728,058 B2
(45) Date of Patent: Aug. 8, 2017

(54) SMOKE DETECTION MECHANISM (71) Applicant: Quanta Computer Inc., Taoyuan (TW)

(72) Inventors: Kai-Fan Ku, Taoyuan (TW); Chin-Fu Tsai, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 71 days.

(21) Appl. No.: 14/953,790

(22) Filed: Nov. 30, 2015

(65) Prior Publication Data

US 2017/0154510 A1 Jun. 1, 2017

(51) Int. Cl.
- *G08B 17/10* (2006.01)
- *G06F 9/44* (2006.01)
- *G06F 11/30* (2006.01)

(52) U.S. Cl.
CPC ............. *G08B 17/10* (2013.01); *G06F 9/442* (2013.01); *G06F 11/3058* (2013.01)

(58) Field of Classification Search
CPC .................... G06F 11/3058; G06F 11/3089
USPC .......................................................... 714/48
See application file for complete search history.

(56) References Cited

U.S. PATENT DOCUMENTS

| | | | | |
|---|---|---|---|---|
| 6,407,671 B1* | 6/2002 | Mulvihill | ............... | G08B 17/10 340/628 |
| 2004/0135695 A1* | 7/2004 | Barton | ................. | G08B 25/002 340/628 |
| 2004/0246137 A1* | 12/2004 | Bobenhausen | ........ | G08B 17/10 340/606 |
| 2014/0125487 A1* | 5/2014 | Polak | ..................... | G08B 17/10 340/628 |
| 2015/0036293 A1* | 2/2015 | Martini | ................ | F24F 11/0001 361/695 |

* cited by examiner

*Primary Examiner* — Chae Ko
(74) *Attorney, Agent, or Firm* — Nixon Peabody LLP; Eduardo J. Quinones (57) ABSTRACT

Systems, methods, and computer-readable storage media for detecting smoke in a computer system. The system detects smoke via a first smoke detector located at an airflow inlet of the system or a second smoke detector located at an airflow outlet of the system. Next, the system determines whether the smoke originates from inside of the system or outside of the system to yield a determination of an originating location of the smoke. Based on the determination of the originating location of the smoke, the system then generates a response to the smoke.

20 Claims, 8 Drawing Sheets

SMOKE DETECTION MECHANISM

TECHNICAL FIELD

The present technology pertains to computer systems, and more specifically pertains to detecting smoke in a computer system.

BACKGROUND

The performance and processing capabilities of computers has shown tremendous and steady growth over the past few decades. Not surprisingly, computing systems, such as servers, are becoming more and more complex, often equipped with an increasing number and type of components, such as processors, memories, and add-on cards. Most experts agree this trend is set to continue far into the future.

However, with a growing number and complexity of components within a limited space, computing systems are increasingly vulnerable to physical, chemical, and electrical reactions. Such reactions can generate smoke or fire. For example, a short circuit in the system can create sparks and smoke. As a result, electrical components in the system can get burnt and damaged. Such damage can even extend to neighboring devices, particularly in datacenters or network closets where multiple electrical devices are housed within a limited and often closed space. Accordingly, a mechanism for detecting a reaction and responding early would be advantageous, and may limit the damage to affected systems and components, as well as nearby systems.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for detecting smoke in a computer system. The system can detect smoke via a first smoke detector located at an airflow inlet of the system and/or a second smoke detector located at an airflow outlet of the system, to yield detected smoke. In some aspects, the first smoke detector can be located outside of the system either at or proximate to the airflow inlet on the system, and the second smoke detector can be located inside of the system either at or proximate to the airflow outlet on the system. However, in other aspects, the first smoke detector can be located inside of the system either at or proximate to the airflow inlet on the system.

Next, the system can determine, based on the detected smoke, whether the smoke originates from inside of the system or outside of the system, to yield a determination of an originating location of the smoke. For example, the system can determine that the smoke originates from inside of the system when the smoke is detected by the second smoke detector. On the other hand, the system can determine that the smoke originates from outside of the system when the smoke is detected by the first smoke detector. If both the smoke is detected by both the first and second smoke detectors, the system can determine whether the smoke originates from inside of the system or outside of the system based on which of the first and second smoke detectors first detected the smoke. For example, if the first smoke detector detects the smoke before the second smoke detector, the system can infer that the smoke originates from outside the system. On the other hand, if the second smoke detector detects the smoke before the first smoke detector, the system can infer that the smoke originates from inside the system.

Based on the determination of the originating location of the smoke, the system can generate a response to the smoke. The response to the smoke can include, for example, logging a smoke event indicating that smoke has been detected, activating a light-emitting diode (LED) coupled with the system (e.g., sending a signal to the LED to blink), transmitting a notification (e.g., electronic mail message, network message, simple network management protocol message, etc.) to a remote device, generating an instruction to shutdown or turn off the system, and/or generating an instruction to shutdown or turn off one or more neighboring devices.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Disclosed are systems, methods, and non-transitory computer-readable storage media for detecting smoke in a computing system. A brief introductory description of example systems and configurations for detecting smoke in a computing system are first disclosed herein. A detailed description of detecting smoke in a system, including examples and variations, will then follow. These variations shall be described herein as the various embodiments are set forth. The disclosure now turns to FIGS. 1A and 1B.

Figure 1A:
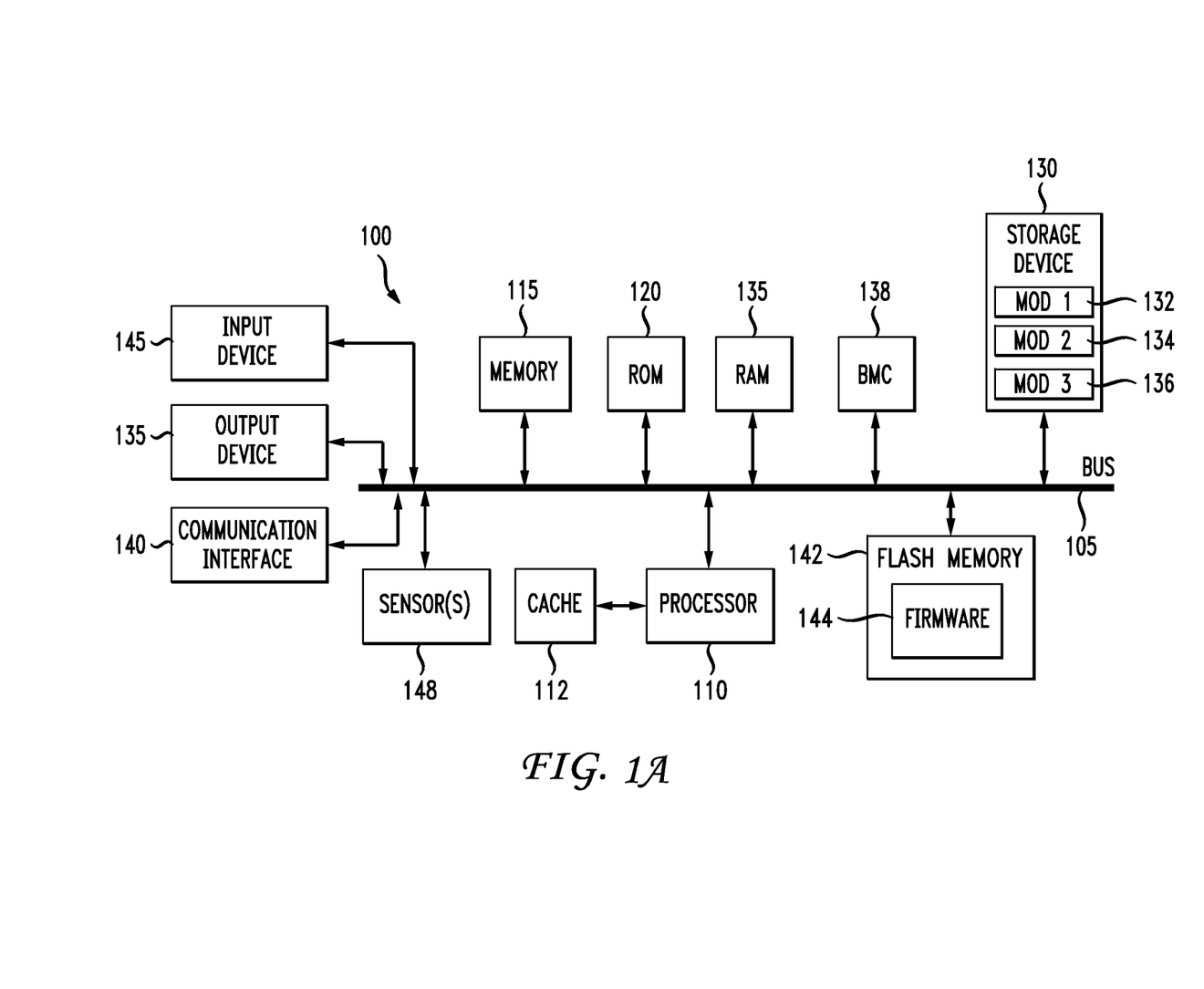
FIGS. 1A-B illustrate example system embodiments.
Figure 1B:
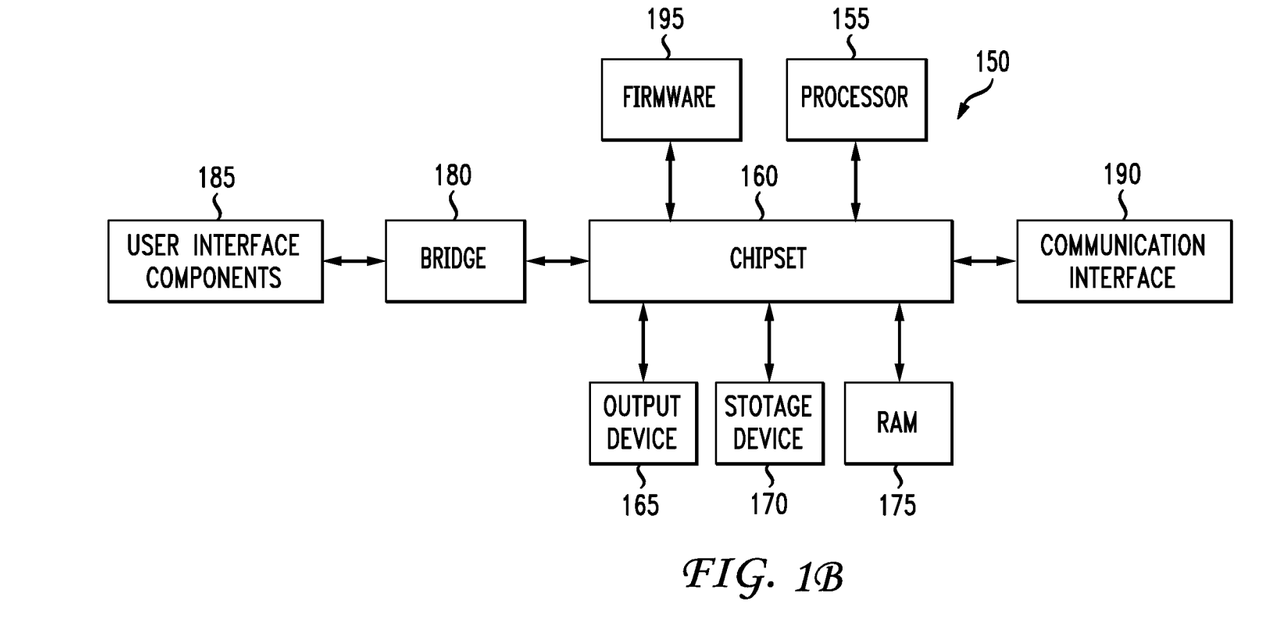

FIGS. 1A and 1B illustrate example system embodiments. The more appropriate embodiment will be apparent to those of ordinary skill in the art when practicing the present technology. Persons of ordinary skill in the art will also readily appreciate that other system embodiments are possible.

FIG. 1A illustrates a system bus computing system architecture 100 wherein the components of the system are in electrical communication with each other using a bus 105. Example system 100 includes a processing unit (CPU or processor) 110 and a system bus 105 that couples various system components including the system memory 115, such as read only memory (ROM) 120 and random access memory (RAM) 135, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules can control or be configured to control the processor 110 to perform various actions. Other system memory 115 may be available for use as well. The memory 115 can include multiple different types of memory with different performance characteristics. The processor 110 can include any general purpose processor and a hardware module or software module, such as module 1 137, module 7 134, and module 3 136 stored in storage device 130, configured to control the processor 910 as well as a special-purpose processor where software instructions are incorporated into the actual processor design. The processor 110 may essentially be a completely self-contained computing system, containing multiple cores or processors, a bus, memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 175, read only memory (ROM) 170, and hybrids thereof.

The storage device 130 can include software modules 137, 134, 136 for controlling the processor 110. Other hardware or software modules are contemplated. The storage device 130 can be connected to the system bus 105. In one aspect, a hardware module that performs a particular function can include the software component stored in a computer-readable medium in connection with the necessary hardware components, such as the processor 110, bus 105, display 135, and so forth, to carry out the function.

The BMC (baseboard management controller) 138 can be a specialized microcontroller or processor on the system 100. In some cases, the BMC 138 can be part of an Intelligent Platform Management Interface (IPMI). Moreover, in some cases, the BMC 138 can be embedded on a motherboard or main circuit board of the system 100. The BMC 360 can manage the interface between system management software and platform hardware. Different types of sensors (e.g., sensors 148) on the system 100 can report to the BMC 138 on parameters such as temperature, cooling fan speeds, power status, operating system (OS) status, smoke, and so forth. The BMC 138 can monitor the sensors and send alerts to an administrator via a network interface, such as communication interface 140, if any of the parameters do not stay within preset limits or thresholds, indicating a potential failure or error of the system 100.

The BMC 138 can also generate specific responses to notifications, alerts, and/or events from the sensors 148, such as logging events, activating a light-emitting diode (LED) (e.g., blink fault LED), send a message to a remote device (e.g., electronic mail message, network message, etc.), generate an instruction or command to turn of the system 100 and/or another system or device, etc. An administrator can also remotely communicate with the BMC 138 to take some corrective action, such as resetting or power cycling the system 100 to restore functionality.

The BMC 138 can also include a system event log controller and/or storage for managing and maintaining events, alerts, and notifications received by the BMC 138. For example, the BMC 138 or a system event log controller can receive alerts or notifications from one or more sensors 148 and maintain the alerts or notifications in a system even log storage component.

Flash memory 142 can be an electronic non-volatile computer storage medium or chip which can be used by the system 100 for storage and/or data transfer. The flash memory 142 can be electrically erased and/or reprogrammed. Flash memory 142 can include erasable programmable read-only memory (EPROM), electrically erasable programmable read-only memory (EEPROM), ROM, NVRAM, or complementary metal-oxide semiconductor (CMOS), for example. The flash memory 142 can store the firmware 144 executed by the system 100 when the system 100 is first powered on, along with a set of configurations specified for the firmware 144. The flash memory 142 can also store configurations used by the firmware 144.

The firmware 144 can include a Basic Input/Output System or its successors or equivalents, such as an Extensible Firmware Interface (EFI) or Unified Extensible Firmware Interface (UEFI). The firmware 144 can be loaded and executed as a sequence program each time the system 100 is started. The firmware 144 can recognize, initialize, and test hardware present in the system 100 based on the set of configurations. The firmware 144 can perform a self-test, such as a Power-on-Self-Test (POST), on the system 100. This self-test can test functionality of various hardware components such as hard disk drives, optical reading devices, cooling devices, memory modules, expansion cards and the like. The firmware 144 can address and allocate an area in the memory 115, ROM 120, RAM 125, and/or storage device 130, to store an operating system (OS). The firmware 144 can load a boot loader and/or OS, and give control of the system 100 to the OS.

The firmware 144 of the system 100 can include a firmware configuration that defines how the firmware 144 controls various hardware components in the system 100. The firmware configuration can determine the order in which the various hardware components in the system 100 are started. The firmware 144 can provide an interface, such as an UEFI, that allows a variety of different parameters to be set, which can be different from parameters in a firmware default configuration. For example, a user (e.g., an administrator) can use the firmware 144 to specify clock and bus speeds, define what peripherals are attached to the system 100, set monitoring of health (e.g., fan speeds and CPU temperature limits), and/or provide a variety of other parameters that affect overall performance and power usage of the system 100.

While firmware 144 is illustrated as being stored in the flash memory 142, one of ordinary skill in the art will readily recognize that the firmware 144 can be stored in other memory components, such as memory 115 or ROM 120, for example. However, firmware 144 is illustrated as being stored in the flash memory 142 as a non-limiting example for explanation purposes.

System 100 can include one or more sensors 148. The one or more sensors 148 can include one or more smoke detectors. The one or more sensors 148 can also include, for example, one or more temperature sensors, thermal sensors, oxygen sensors, chemical sensors, noise sensors, heat sensors, current sensors, voltage detectors, air flow sensors, gas sensors, flow sensors, water sensors, flame detection sensors, infrared thermometers, heat flux sensors, thermometers, pyrometers, etc. The one or more sensors 148 can communicate with the processor, cache 112, flash memory 142, communications interface 140, memory 115, ROM 120, RAM 125, BMC 138, and storage device 130, via the bus 105, for example. The one or more sensors 148 can also communicate with other components in the system via one or more different means, such as inter-integrated circuit (I2C), general purpose output (GPO), and the like.

FIG. 1B illustrates an example computer system 150 having a chipset architecture that can be used in executing the described method(s) or operations, and generating and displaying a graphical user interface (GUI). Computer system 150 can include computer hardware, software, and firmware that can be used to implement the disclosed technology. System 150 can include a processor 155, representative of any number of physically and/or logically distinct resources capable of executing software, firmware, and hardware configured to perform identified computations. Processor 155 can communicate with a chipset 160 that can control input to and output from processor 155. In this example, chipset 160 outputs information to output 165, such as a display, and can read and write information to storage device 170, which can include magnetic media, and solid state media, for example. Chipset 160 can also read data from and write data to RAM 175. A bridge 180 for interfacing with a variety of user interface components 185 can be provided for interfacing with chipset 160. Such user interface components 185 can include a keyboard, a microphone, touch detection and processing circuitry, a pointing device, such as a mouse, and so on. In general, inputs to system 150 can come from any of a variety of sources, machine generated and/or human generated.

Chipset 160 can also interface with one or more communication interfaces 190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 155 analyzing data stored in storage 170 or 175. Further, the machine can receive inputs from a user via user interface components 185 and execute appropriate functions, such as browsing functions by interpreting these inputs using processor 155.

Moreover, chipset 160 can also communicate with firmware 195, which can be executed by the computer system 150 when powering on. The firmware 195 can recognize, initialize, and test hardware present in the computer system 150 based on a set of firmware configurations. The firmware 195 can perform a self-test, such as a POST, on the system 150. The self-test can test functionality of the various hardware components 155-190. The firmware 195 can address and allocate an area in the memory 175 to store an OS. The firmware 195 can load a boot loader and/or OS, and give control of the system 150 to the OS. In some cases, the firmware 195 can communicate with the hardware components 155-190. Here, the firmware 195 can communicate with the hardware components 155 and 165-190 through the chipset 160 and/or through one or more other components. In some cases, the firmware 195 can communicate directly with the hardware components 155-190.

It can be appreciated that example systems 100 and 150 can have more than one processor 110 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described herein.

Figure 2A:
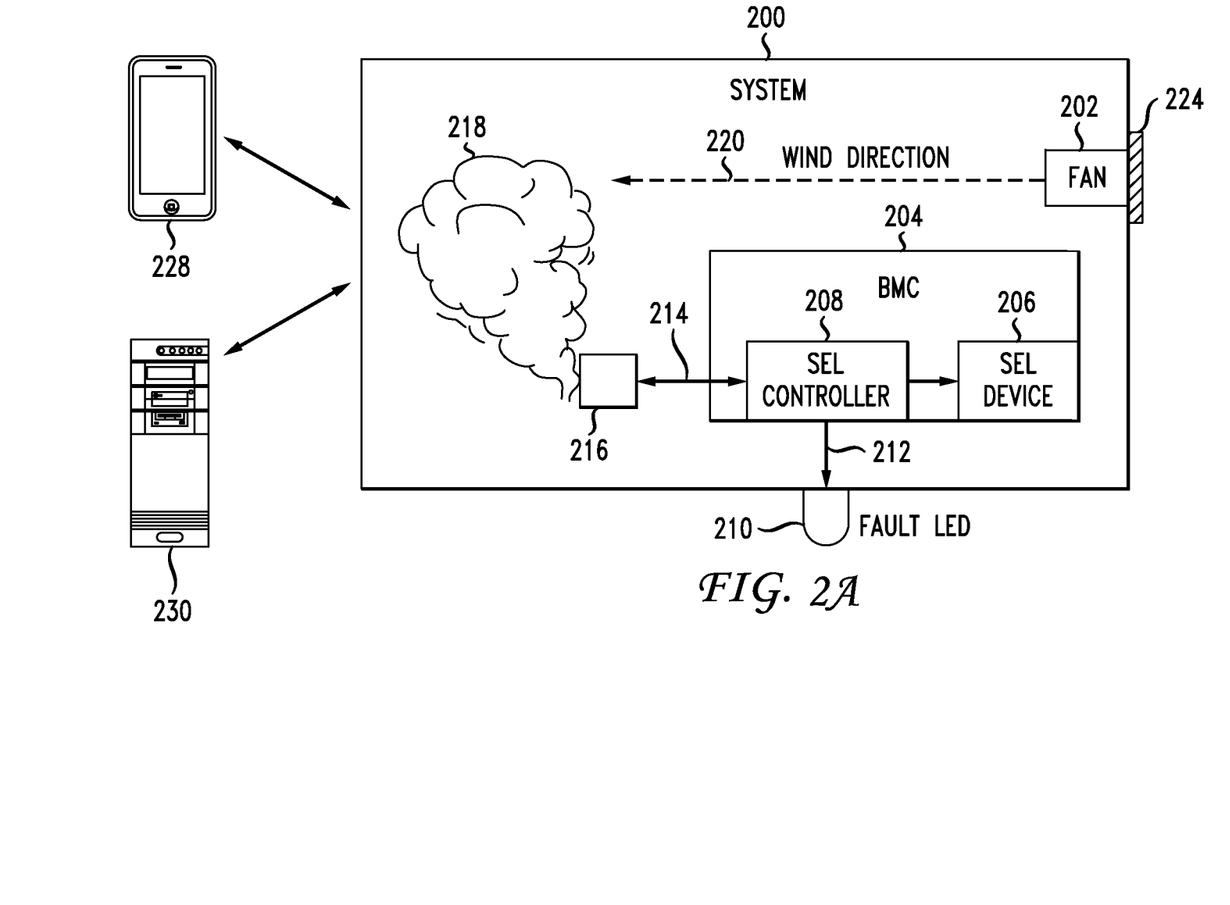
FIGS. 2A, 2B, and 2C illustrate schematic diagrams of example system configurations for detecting smoke in accordance with some embodiments.
Figure 2B:
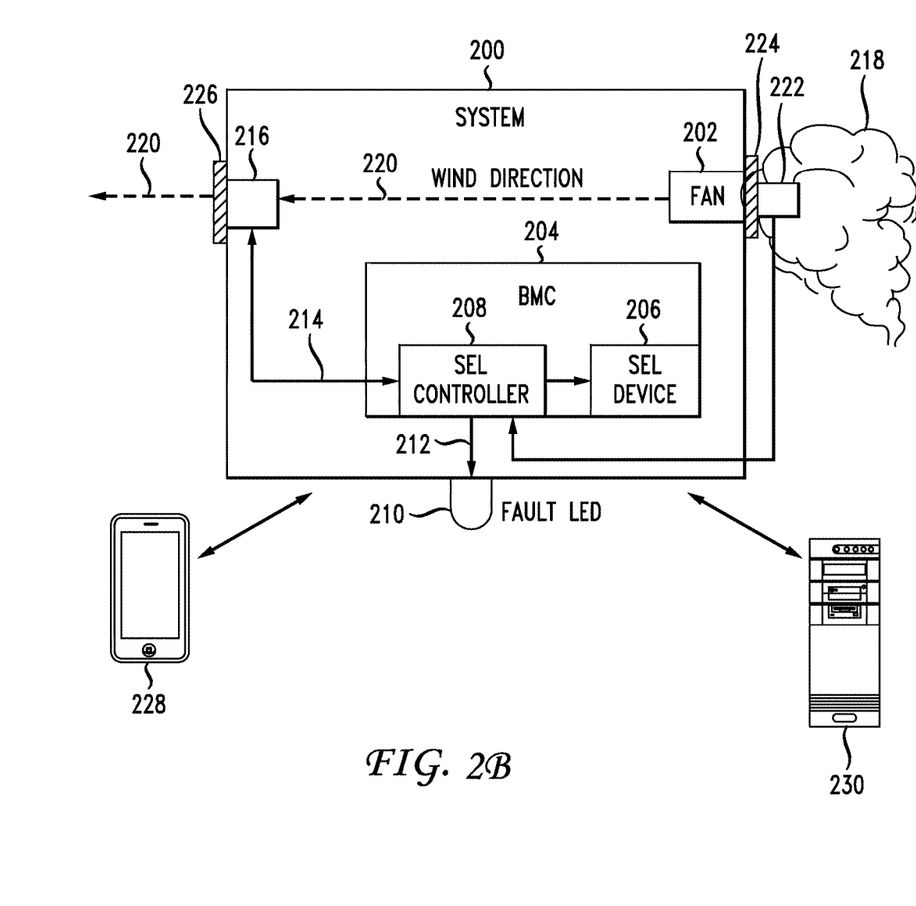
Figure 2C:
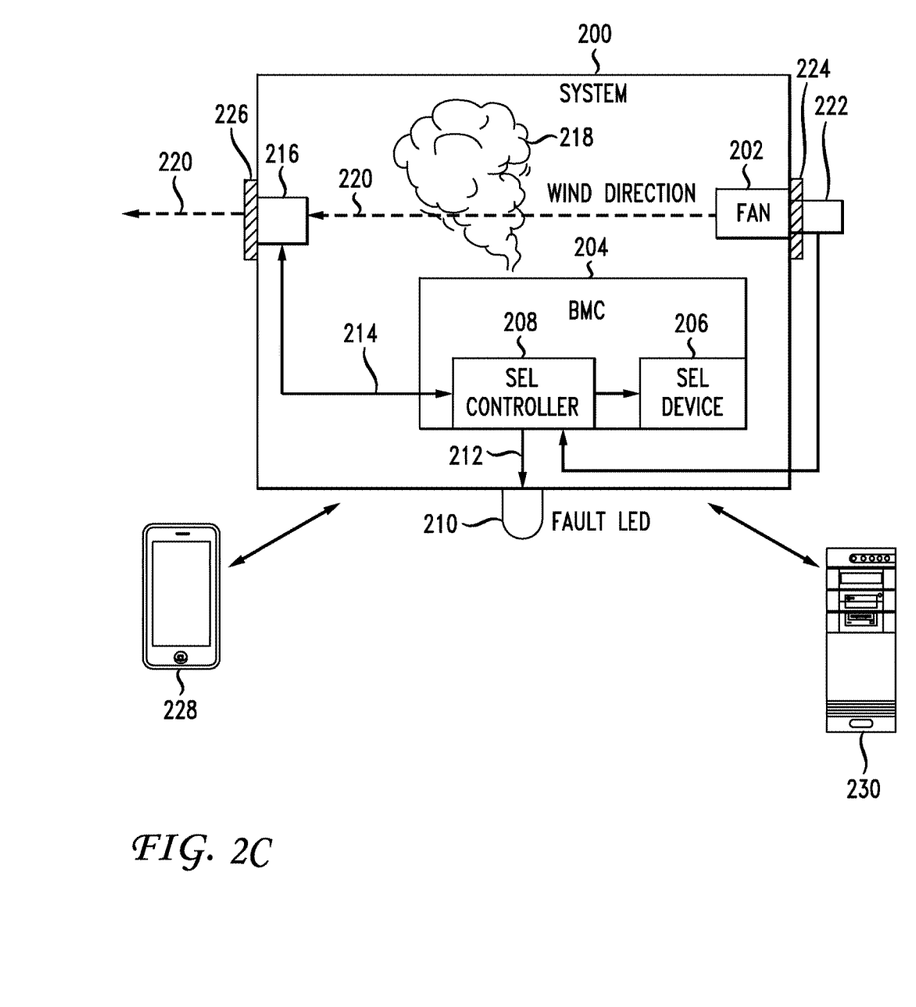

FIGS. 2A-C illustrate schematic diagrams of example system configurations for detecting smoke in accordance with some embodiments. Referring to FIG. 2A, system 200 can include a fan 202 for circulating air within the system

200. The air can be circulated inside of the system 200 in a specific direction 220 based on the configuration of the fan 202 and/or any airflow vents on the system 200. The system 200 can include an airflow inlet 224 for allowing air to enter the system 200. This can provide air circulation inside the system 200 and help reduce or dissipate heat inside the system 200. Air from the airflow inlet 224 can flow into the fan 202, which can further help circulate air inside the system 200.

The system 200 can include a sensor 216 for detecting smoke 218 in the system 200. The sensor 216 can be a smoke detector residing inside of the system 200. The sensor 216 can be communicatively coupled with the BMC 204 and/or system even log (SEL) controller 208. For example, the sensor 216 can communicate with the BMC 204 and/or SEL controller 208 via inter-integrated circuit (I2C) for communicating or reporting smoke-related events (e.g., smoke detection). The SEL controller 208 can store or maintain any smoke-related events received from the sensor 216 in an SEL storage device 206. The SEL storage device 206 can be any computer-readable medium for storing events or information.

The SEL controller 208 and/or the BMC 204 can also communicate with a light-emitting diode (LED) 210 for activating the LED 210. For example, the SEL controller 208 and/or the BMC 204 can communicate with LED 210 via general purpose input/output (GPO) or any other means. The SEL controller 208 and/or the BMC 204 can activate the LED 210 in response to a signal from the sensor 216 to indicate a sensed event, such as a detection of smoke by the sensor 216. The activation of the LED 210 can cause the LED 210 to light or blink once or multiple times according to a pattern. For example, the LED 210 can be activated to blink repeatedly to indicate that smoke has been detected by the sensor 216.

The BMC 204 can also generate specific responses in response to receiving a smoke detection signal or alert from the sensor 216. For example, the BMC 204 can generate a request, command, or instruction to shutdown or power off the system 200 and/or another system, such as one or more nearby devices (e.g., devices 228 and 230). The BMC 204 can also generate a message to indicate that smoke has been detected by the sensor 216. For example, the BMC 204 can generate an electronic email message, a simple network management protocol (SNMP) message, etc., to indicate that smoke has been detected by the sensor 216. The BMC 204 can also generate an audio alert to be outputted via a speaker, for example, to alert users that smoke has been detected by the sensor 216.

In some cases, the sensor 216 can include multiple sensors. For example, in some aspects, the sensor 216 can include a smoke detector sensor and a temperature or heat sensor. The BMC 204 can thus receive signals, measurements, or data from multiple sensors. The system 200 can use the information from multiple sensors to sense, infer, or detect a condition. For example, the system 200 can infer that a component is on fire based on a high temperature detected by a sensor and smoke detected by another sensor. As another example, the system 200 can determine a direction or origin of the smoke detected by sensor 216 based on information obtain from other sensors, such as temperature, wind direction, etc. In some cases, the system 200 can infer a condition or situation from a lack of signal from other sensors. For example, if sensor 216 does not detect any smoke but a different sensor placed elsewhere in or out of the system 200 detects smoke, then the system 200 can determine that smoke has originated from outside of the system 200 or from a component closer to the other sensor than sensor 216.

The system 200 can be communicatively coupled with devices 228 and 230. Devices 228 and 230 can include, for example, client devices (e.g., laptops or smartphones), network devices (e.g., switches or routers), servers, and so forth. Moreover, devices 228 and 230 can be nearby devices and/or remote devices. For example, device 230 can be a server in the same room, datacenter, and/or network closet as system 200, and device 228 can be a remote device, such as a remote smartphone. Thus, system 200 can communicate with local or neighboring devices, such as device 230 in this example, to transmit signals for shutting down or powering off such devices when smoke is detected, as well as remote devices, such as device 228 in this example, to alert or notify users of a detected smoke condition.

Referring to FIG. 2B, the sensor 216 can be placed at an airflow outlet 226 of the system 200. The airflow outlet 226 can be an opening in the system 200 (e.g., opening in a system wall) for air to escape in order to recycle air or maintain airflow in the system 200, for example. The sensor 216 can be placed inside or outside of the system 200, near, or at a portion of, the airflow outlet 226. For example, the sensor 216 can be placed inside the system 200 over a portion of the airflow outlet 226 (e.g., overlapping with a portion of the airflow outlet 226), or within a proximity of the airflow outlet 226, such as within 1-12 inches, or anywhere on the same wall of the system 200 where the airflow outlet 226 is located. Moreover, the sensor 216 can detect smoke 218 inside of the system 200 or flowing out of the system 200 through the airflow outlet 226.

The system 200 can also include an airflow inlet 224 for allowing air to enter the system 200. The airflow inlet 224 can be an opening in the system 200 (e.g., opening in a system wall) for allowing air to enter and flow into the system 200. The airflow inlet 224 can allow air to flow into the fan 202 to provide air circulation within the system 200. In some cases, the fan 202 can be placed over an inside portion of the airflow inlet 224 to receive air passing through the airflow inlet 224 into the system 200. In other cases, the fan 202 can be located within a distance or proximity of the airflow inlet 224, such as within 1-12 inches or within the same system wall where the airflow inlet 224 is located.

The airflow outlet 226 and airflow inlet 224 can be placed on opposite sides of the system 200. However, in some configurations, the airflow outlet 226 and airflow inlet 224 can be placed on adjacent walls, non-adjacent walls (opposite or not), or any other placement configuration. Moreover, while FIG. 2B is depicted with one airflow outlet 226 and one airflow inlet 224, other configurations are also contemplated herein. For example, the system 200 can include multiple airflow outlets and/or inlets placed in different locations. FIG. 2B illustrates one airflow outlet and one airflow inlet as a non-limiting example for explanation purposes.

Sensor 222 can also be placed on or near the airflow inlet 224. The sensor 222 can be placed on an outside of the system 200 (e.g., outside a chassis of the system 200) or an inside of the system 200 (e.g., inside the chassis of the system 200), for example. The sensor 222 can detect smoke 218 outside of the system 200 or flowing into the system 200 through the airflow inlet 224.

The placement of sensor 216 and sensor 222 can not only help system 200 detect smoke inside and outside of the system 200, but also determine whether the smoke is coming from inside or outside of the system 200. For example, if sensor 222 detects smoke 218 outside of the system 200 and sensor 216 does not detect smoke inside of the system 200, then the system can infer that the smoke is coming from outside of the system 200.

On the other hand, referring to FIG. 2C, if sensor 216 detects smoke 218 inside the system 200 and sensor 222 does not detect smoke 218 outside of the system 200, then the system 200 can infer that the smoke is coming from inside of the system 200. If both sensors 216 and 222 detect smoke, the system 200 can infer that the smoke has reached both the inside and outside of the system 200. The system 200 can also infer whether the smoke originates from inside or outside of the system 200 based on which of the sensors 216 and 222 detected the smoke first. For example, if sensor 216 detects smoke before sensor 222 then the system 200 can infer that the smoke originated within the system 200. On the other hand, if sensor 222 detects smoke before sensor 216, then the system 200 can infer that the smoke originated outside of the system 200.

When detecting smoke, both sensors 216 and 222 can communicate with SEL controller 208 and/or BMC 204 to signal that smoke has been detected. For example, sensor 222 can send a signal or notification to SEL controller 208 that smoke has been detected by sensor 222. SEL controller 208 can log an event on the SEL device 206 for any signal received by sensor 216 and 222 indicating that smoke has been detected. SEL controller 208 and/or BMC 208 can also generate a signal or notification indicating smoke has been detected. For example, BMC 208 can generate an SNMP message or an electronic mail message, for example, for transmission on the network to other devices to alert users or devices that smoke has been detected by sensor 216 and/or 222 at system 200. Such messages can be communicated over a network via a communication interface, such as communication interface 140.

BMC 204 can also generate instructions or commands to shutdown or turn off one or more devices, including system 200. For example, if sensor 222 detects smoke 218 outside of the system 200, then BMC 204 (or a processor coupled with BMC 204) can generate instructions or commands to shutdown or power off system 200 and/or any nearby or remote devices, such as devices 228 and/or 230. In some configurations, system 200 can send a shutdown instruction or command to specific devices near system 200, all devices on the same local area network (LAN) as system 200, all devices within a range of addresses (e.g., Internet Protocol (IP) addresses), all devices connected to the same switch or router as system 200, all devices connected to the same bridge as system 200, all devices on the same network closet as system 200, etc. For example, system 200 can determine that system 230 is a neighboring server and send a command to shutoff or power off system 230 when smoke is detected. System 200 can also transmit, via a network, an alert or notification to a remote device (e.g., device 228), indicating that smoke has been detected.

In some cases, system 200 can also generate a visual or audio alert when sensor 216 and/or 222 detects smoke. For example, system 200 can activate LED 210 to alert users that smoke has been detected. LED 210 can light up or blink once, blink according to a pattern, or remain lit for a period of time. To illustrate, BMC 204 can communicate a signal to LED 210 to activate LED 210 when smoke has been detected by sensors 216 and/or 222. BMC 204 can also communicate with one or more additional components, such as network interfaces, processors, memory devices, peripherals, speakers, displays, etc., in order to provide other types of alerts. For example, BMC 204 can communicate with a speaker to generate an audio alert. As another example, BMC 204 can communicate with a remote server to transmit even notifications or statistics to the remote server. The remote server can maintain event notifications or statistics and further trigger additional actions or responses. For example, the remote server can transmit a signal to turn off power to devices connected to system 200 or within a vicinity of system 200 (e.g., same network closet or datacenter). In some cases, system 200 can generate an instruction or command for powering off a power supply, such as an uninterruptible power supply (UPS) connected to system 200 and/or nearby devices.

As one of ordinary skill in the art will recognize, system 200 can include some or all components from systems 100 and/or 150 illustrated in FIGS. 1A and 1B. System 200 can also include additional components, hardware, or elements. For example, system 200 can include a chassis, one or more power supplies, one or more extra components (e.g., cards, devices, connections), etc.

Figure 3:
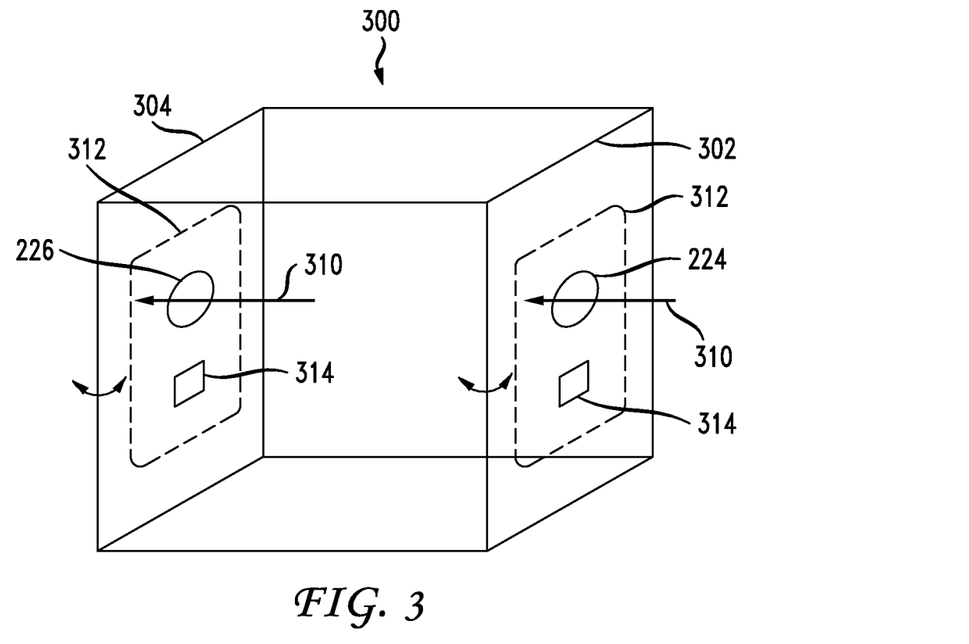
FIG. 3 illustrates a schematic diagram of an example system chassis configured with sensors for detecting smoke.

FIG. 3 illustrates a schematic diagram of an example configuration of a chassis 300 for detecting smoke in a system. The chassis 300 can include an airflow inlet 224 and an airflow outlet 226. Airflow inlet 224 can be an opening on a first wall 302 of the chassis 300. Airflow outlet 226 can be an opening on a second wall 304 of the chassis 300. The airflow inlet 224 can allow air to flow into the chassis 300 and the airflow outlet 226 can allow air to flow out of the chassis 300. Wind or air can circulate through the chassis 300 in a direction 310 flowing from the airflow inlet 224 to the airflow outlet 226. In some cases, the circulation or flow of air within the chassis 300 can be furthered with a fan (not shown) running inside of the chassis 300. The fan can be positioned at or near the airflow inlet 224 to receive air flowing through the airflow inlet 224 from outside of the chassis 300. The fan can thus circulate the air flowing through the airflow inlet 224 within the chassis 300. The airflow outlet 226 can release the air or otherwise allow air circulated within the chassis 300 to escape or flow outside of the chassis 300.

One or more sensors 314 can be placed within a proximity 312 of the airflow inlet 224 and/or airflow outlet 226. The proximity 312 can be within a certain distance, such as 1-12 inches, of the airflow inlet 224 and/or airflow outlet 226. The proximity 312 can also be anywhere within the same wall as the airflow inlet 224 and/or airflow outlet 226. For example, the proximity 312 can be anywhere on wall 302 where airflow inlet 224 is located in the chassis 300. The one or more sensors 314 can be placed on an inside of the chassis 300 and/or an outside of the chassis 300. For example, a sensor can be placed on the outside of wall 302 on the chassis and another sensor can be placed on the inside of wall 304 on the chassis, and vice versa.

While FIG. 3 illustrates two sensors, one airflow inlet, and one airflow outlet, other configurations are also contemplated herein. For example, chassis 300 can include more sensors, different types of sensors, and/or one or more additional airflow inlets or airflow outlets. The example shown in FIG. 3 is a non-limiting example for illustration purposes and the sake of clarity.

Figure 4:
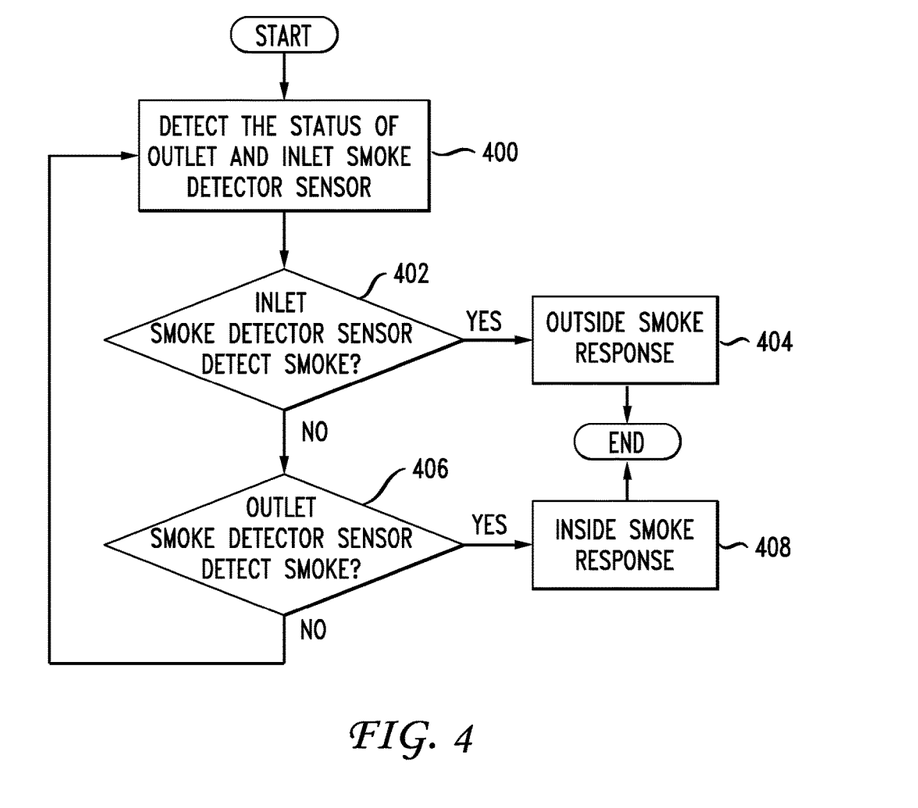
FIG. 4 illustrates a flowchart of an example process for detecting smoke in a system.
Figure 5:
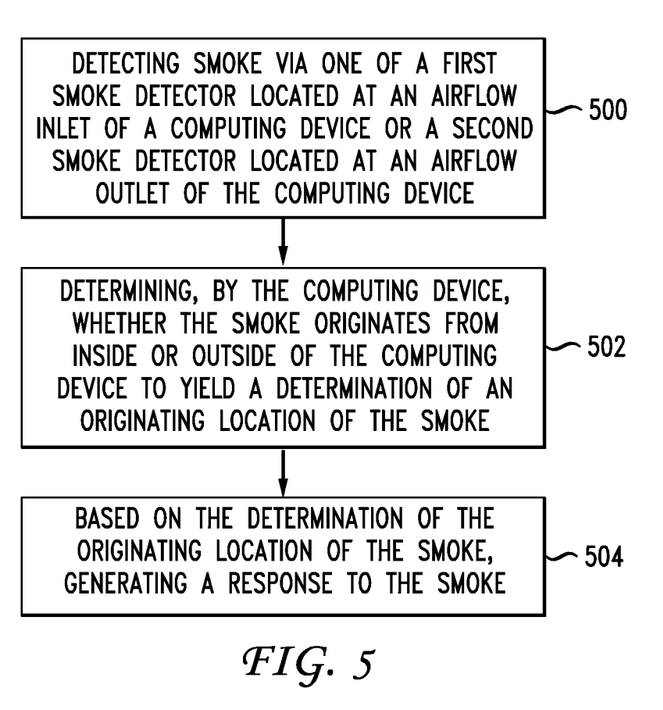
FIG. 5 illustrates an example method embodiment.

Having disclosed some basic system components and concepts, the disclosure now turns to the example flowchart and method embodiments shown in FIGS. 4 and 5. For the sake of clarity, the flowchart and method in FIGS. 4 and 5 are described in terms of system 100, as shown in FIG. 1, configured to practice the steps. The steps outlined herein are exemplary and can be implemented in any combination thereof, including combinations that exclude, add, or modify certain steps.

FIG. 4 illustrates a flowchart of an example process for detecting smoke in a system. At step 400, the system 100 detects the status of outlet sensor 216 and inlet sensor 222. At step 402, the system 100 determines if inlet sensor 222 has detected smoke. If inlet sensor 222 has detected smoke, the system 100 generates an outside smoke response at step 404. The outside smoke response can include generating an instruction or command to shutdown or turn off any nearby or neighboring devices. For example, the outside smoke response can include generating an instruction of command to turn off any servers on the same LAN, subnet, switch, network segment, datacenter, or network closet as system 100. The outside smoke response can also include generating an instruction or command to shutdown or turn off system 100. For example, system 100 can generate a command to automatically power off in response to detecting the smoke.

The outside smoke response can also include other steps or actions, such as logging the event, activating a fault LED, or sending one or more messages or notifications, such as an electronic mail message or an SNMP message. The system 100 can send one or more types of messages or notifications over the network. For example, the system 100 can send a network message to a remote, centralized server, over the network. As another example, the system 100 can generate a message to be transmitted to the network administrator's personal device, such as the network administrator's smartphone, for example.

At step 406, if system 100 determines that inlet sensor 222 has not detected smoke, system 100 can then determine if outlet sensor 216 has detected smoke. If outlet sensor 216 has not detected smoke, the system 100 can return to step 400. On the other hand, if system 100 determines that outlet sensor 216 has detected smoke, system 100 can generate an inside smoke response. The inside smoke response can include generating an instruction or command to automatically turn off or shutdown system 100. This can help prevent or mitigate any smoke or fire-related damage to system 100.

In addition, the inside smoke response can include other or additional steps or actions. For example, the inside smoke response can include logging the event, activating a fault LED (e.g., blinking the LED), and/or sending a message to a remote device. The message to the remote device can include, for example, an electronic mail message, an SNMP message, and/or any network alert.

FIG. 5 illustrates an example method embodiment. At step 500, system 100 can detect smoke via a first smoke detector located at an airflow inlet of the system 100 (e.g., inlet sensor 222) and/or a second smoke detector located at an airflow outlet of the system 100 (e.g., outlet sensor 216), to yield detected smoke. In some aspects, the first smoke detector can be located outside of the system 100 either at or proximate to the airflow inlet on the system 100, and the second smoke detector can be located inside of the system 100 either at or proximate to the airflow outlet on the system 100. However, in other aspects, the first smoke detector can be located inside of the system 100 either at or proximate to the airflow inlet on the system 100, and the second smoke detector can be located outside of the system 100 either at or proximate to the airflow outlet on the system 100.

Next, at step 502, the system 100 can determine, based on the detected smoke, whether the smoke originates from inside or outside of the system 100, to yield a determination of an originating location of the smoke. For example, the system 100 can determine that the smoke originates from inside of the system 100 when the smoke is detected by the second smoke detector. On the other hand, the system 100 can determine that the smoke originates from outside of the system 100 when the smoke is detected by the first smoke detector. If both the smoke is detected by both the first and second smoke detectors, the system 100 can determine whether the smoke originates from inside of the system 100 or outside of the system 100 based on which of the first and second smoke detectors first detected the smoke. For example, if the first smoke detector detects the smoke before the second smoke detector, the system 100 can infer that the smoke originates from outside the system 100. On the other hand, if the second smoke detector detects the smoke before the first smoke detector, the system 100 can infer that the smoke originates from inside the system 100.

The system 100 can also infer whether the smoke comes from inside or outside of the system 100 based on a status of one or more additional sensors placed inside and/or outside of the system 100. For example, the system 100 can infer that the smoke comes from inside of the system 100 based on additional detections of smoke by other sensors inside of the system 100. As another example, the system 100 can infer that the smoke comes from inside of the system 100 based on a threshold temperature sensed by a temperature sensor inside of the system. For example, if a temperature sensor senses a temperature level inside of the system 100 above an expected temperature level, the system 100 can infer that the elevated temperature is a result of a physical, chemical, or electrical reaction inside the system 100 which may be causing the smoke.

Based on the determination of the originating location of the smoke, the system 100 can generate a response to the smoke at step 504. The response to the smoke can include, for example, logging a smoke event indicating that smoke has been detected, activating a light-emitting diode (LED) coupled with the system 100 (e.g., sending a signal to the LED to blink), transmitting a notification (e.g., electronic mail message, network message, simple network management protocol message, etc.) to a remote device, generating an instruction to shutdown or turn off the system 100, and/or generating an instruction to shutdown or turn off one or more neighboring devices. The response to the smoke can vary based on whether the smoke is determined to originate inside or outside of the system 100. For example, if the smoke is determined to originate inside of the system 100, the system 100 can generate a command to automatically turn itself off or shutdown to prevent further damage. On the other hand, if the smoke is determined to originate outside of the system 100, the system 100 can also generate a command to turn off or shutdown other devices, such as any neighboring devices.

The response to the smoke can also depend on whether the system 100 determines that the smoke is contained inside or outside of the system 100, or whether the reaction causing the smoke is spreading or has spread. For example, the system 100 can check the status of additional sensors, such as temperature sensors and/or smoke detectors, placed in other locations inside and/or outside of the system 100, to determine whether the smoke or reaction has been contained within a location or is otherwise spreading. For example, if the system 100 determines that the smoke or reaction is spreading, the system 100 can generate commands to power off additional devices and/or generate additional alerts.

Moreover, the response to the smoke can also depend on the type or characteristics of the reaction that triggered or caused the smoke. For example, the system 100 can determine that the smoke was generated by a fire based on a temperature measured by one or more temperature sensors associated with the system 100. If the measured temperature is above a threshold that is consistent with a spreading fire, the system 100 can generate various types of responses. If the measurements obtained by one or more sensors indicate that the smoke is related to an electrical reaction, the system 100 can generate a response to power off or shutdown the system 100 and/or any other devices, to prevent further damage or exacerbate the fire.

While step 502 describes a determination of whether the smoke originates from inside or outside of the system 100, some configurations may not determine or infer the origin or location of the smoke. Indeed, in some cases, the system 100 can simply generate one or more responses when one or more sensors detect smoke, without trying to determine whether the smoke originates from inside or outside the system 100. Moreover, in some cases, the system 100 can generate one or more responses based on a presence or degree of smoke, with or without determining whether the smoke originates from inside or outside the system 100. For example, the system 100 can include multiple sensors to determine the degree of smoke, and generate one or more responses based on the degree of smoke detected. To illustrate, the system 100 can include multiple smoke detector sensors in various places on the system 100, and determine a degree of smoke detected based on which, or how many, of the smoke detector sensors have detected smoke.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

What is claimed is:

1. A method comprising:
   detecting smoke via one of a first smoke detector located at an airflow inlet of a chassis of a computing device or a second smoke detector located at an airflow outlet of the chassis of the computing device, to yield detected smoke;
   determining, based on the detected smoke, whether the smoke originates from inside of the chassis or outside of the chassis to yield a determination of an originating location of the smoke; and
   based on the determination of the originating location of the smoke, generating a response to the smoke.

2. The method of claim 1, wherein detecting smoke comprises detecting the smoke at both the first smoke detector and the second smoke detector, and wherein determining whether the smoke originates from inside or outside of the chassis comprises:
   determining which of the first smoke detector and the second smoke detector was first to detect the smoke;
   if the first smoke detector was first to detect the smoke, determining that the smokes originates from outside of the chassis; and
   if the second smoke detector was first to detect the smoke, determining that the smokes originates from inside of the chassis.

3. The method of claim 2, wherein, when the determination of the originating location of the smoke indicates that the smoke originates from outside of the chassis, the response to the smoke comprises generating a first instruction to shutdown the computing device and a second instruction to shutdown one or more neighboring computing devices.

4. The method of claim 2, wherein, when the determination of the originating location of the smoke indicates that the smoke originates from inside of the chassis, the response to the smoke comprises generating an instruction to shutdown the computing device.

5. The method of claim 1, wherein the response to the smoke comprises at least one of logging a smoke event indicating that smoke has been detected, changing a display associated with a light-emitting diode (LED) coupled with the computing device, transmitting a notification to a second computing device, generating a first instruction to shutdown the computing device, or generating a second instruction to shutdown a second computing device.

6. The method of claim 5, wherein the notification comprises at least one of a simple network management protocol (SNMP) message or an electronic mail message.

7. The method of claim 1, wherein the airflow inlet comprises an opening in the chassis configured to allow air to flow into a fan inside of the chassis.

8. The method of claim 7, wherein the airflow outlet is located opposite to the airflow inlet on the chassis.

9. The method of claim 1, wherein the first smoke detector is located outside the chassis and the second smoke detector is located inside the chassis.

10. The method of claim 1, further comprising:
transmitting, from at least one of the first smoke detector and the second smoke detector, to a controller coupled with the first smoke detector and the second smoke detector, a signal indicating that smoke has been detected; and
generating, via the controller of the computing device, the response to the smoke.

11. The method of claim 10, wherein the controller comprises at least one of a baseboard management controller (BMC), a processor, or a memory device.

12. The method of claim 11, wherein the memory device comprises a system event log interfacing with the baseboard management controller.

13. The method of claim 10, wherein generating the response to the smoke comprises sending, from the controller to a light-emitting diode coupled with the controller, a signal configured to activate the light-emitting diode.

14. A system comprising:
a processor;
a first smoke detector located at an airflow inlet of the system;
a second smoke detector located at an airflow outlet of the system;
a computer-readable storage medium having stored therein instructions which, when executed by the processor, cause the processor to perform operations comprising:
detecting smoke via one of the first smoke detector or the second smoke detector;
determining whether the smoke originates from inside of the system or outside of the system to yield a determination of an originating location of the smoke; and
based on the determination of the originating location of the smoke, generating a response to the smoke.

15. The system of claim 14, wherein detecting smoke comprises detecting the smoke at both the first smoke detector and the second smoke detector, and wherein determining whether the smoke originates from inside or outside of the system comprises:
determining which of the first smoke detector and the second smoke detector was first to detect the smoke;
if the first smoke detector was first to detect the smoke, determining that the smokes originates from outside of the system; and
if the second smoke detector was first to detect the smoke, determining that the smokes originates from inside of the system.

16. The system of claim 14, wherein:
when the determination of the originating location of the smoke indicates that the smoke originates from outside of the system, the response to the smoke comprises generating a first instruction to shutdown the system and a second instruction to shutdown one or more neighboring computing devices; and
when the determination of the originating location of the smoke indicates that the smoke originates from inside of the system, the response to the smoke comprises generating a second instruction to shutdown the system.

17. The system of claim 14, wherein the response to the smoke comprises at least one of logging a smoke event indicating that smoke has been detected, changing a display associated with a light-emitting diode (LED) coupled with the system, transmitting a notification to a remote computing device, generating a first instruction to shutdown the system, or generating a second instruction to shutdown a remote computing device.

18. A non-transitory computer-readable storage medium having stored therein instructions which, when executed by a processor, cause the processor to perform operations comprising:
receiving, from one of a first smoke detector located at an airflow inlet of a computing device or a second smoke detector located at an airflow outlet of the computing device, a signal indicating that smoke has been detected by the one of the first smoke detector or the second smoke detector;
based on the signal, determining whether the smoke originates from inside of the computing device or outside of the computing device, to yield a determination of an originating location of the smoke; and
based on the determination of the originating location of the smoke, generating a response to the smoke.

19. The non-transitory computer-readable storage medium of claim 18, wherein receiving a signal comprises receiving a first signal from the first smoke detector and a second signal from the second smoke detector, the first signal and the second signal indicating that smoke has been detected by the first smoke detector and the second smoke detector, wherein determining whether the smoke originates from inside or outside of the computing device comprises:
determining which of the first smoke detector and the second smoke detector was first to detect the smoke;
if the first smoke detector was first to detect the smoke, determining that the smokes originates from outside of the computing device; and
if the second smoke detector was first to detect the smoke, determining that the smokes originates from inside of the computing device.

20. The non-transitory computer-readable storage medium of claim 18, wherein the response to the smoke comprises at least one of logging a smoke event indicating that smoke has been detected, changing a display associated with a light-emitting diode (LED) coupled with the computing device, transmitting a notification to a second computing device, generating a first instruction to shutdown the computing device, or generating a second instruction to shutdown a second computing device.

* * * * *